May 9, 1944.  P. F. SCOFIELD ET AL  2,348,656
CONTROL MECHANISM
Filed Feb. 18, 1943  4 Sheets-Sheet 1

INVENTORS
PHILIP F. SCOFIELD
DAVID J. CONANT
BY Frank N. Harmon
ATTORNEY

May 9, 1944.   P. F. SCOFIELD ET AL   2,348,656
CONTROL MECHANISM
Filed Feb. 18, 1943   4 Sheets-Sheet 2

INVENTORS
PHILIP F. SCOFIELD
DAVID J. CONANT
BY Frank H. Harmon
ATTORNEY

May 9, 1944.  P. F. SCOFIELD ET AL  2,348,656
CONTROL MECHANISM
Filed Feb. 18, 1943   4 Sheets-Sheet 3

INVENTORS
PHILIP F. SCOFIELD
DAVID J. CONANT
BY Frank H. Harmon
ATTORNEY

May 9, 1944.　　　P. F. SCOFIELD ET AL　　　2,348,656
CONTROL MECHANISM
Filed Feb. 18, 1943　　　4 Sheets-Sheet 4

INVENTORS
PHILIP F. SCOFIELD
DAVID J. CONANT
BY Frank H. Harmon
ATTORNEY

Patented May 9, 1944

2,348,656

UNITED STATES PATENT OFFICE 2,348,656

CONTROL MECHANISM

Philip F. Scofield and David J. Conant, Cleveland Heights, Ohio, assignors to Jack & Heintz, Inc., Bedford, Ohio, a corporation of Ohio Application February 18, 1943, Serial No. 476,341

7 Claims. (Cl. 172—36)

This invention relates to an electric control mechanism adapted to be operated by both manual and automatic instrumentalities.

The object of the invention is to provide an improved switching and control mechanism in an energizer for aircraft inertia starters which may be operated by manual means, governor means and overload responsive means.

A preferred embodiment of the invention is illustrated in the accompanying drawings in which.

Figure 1:
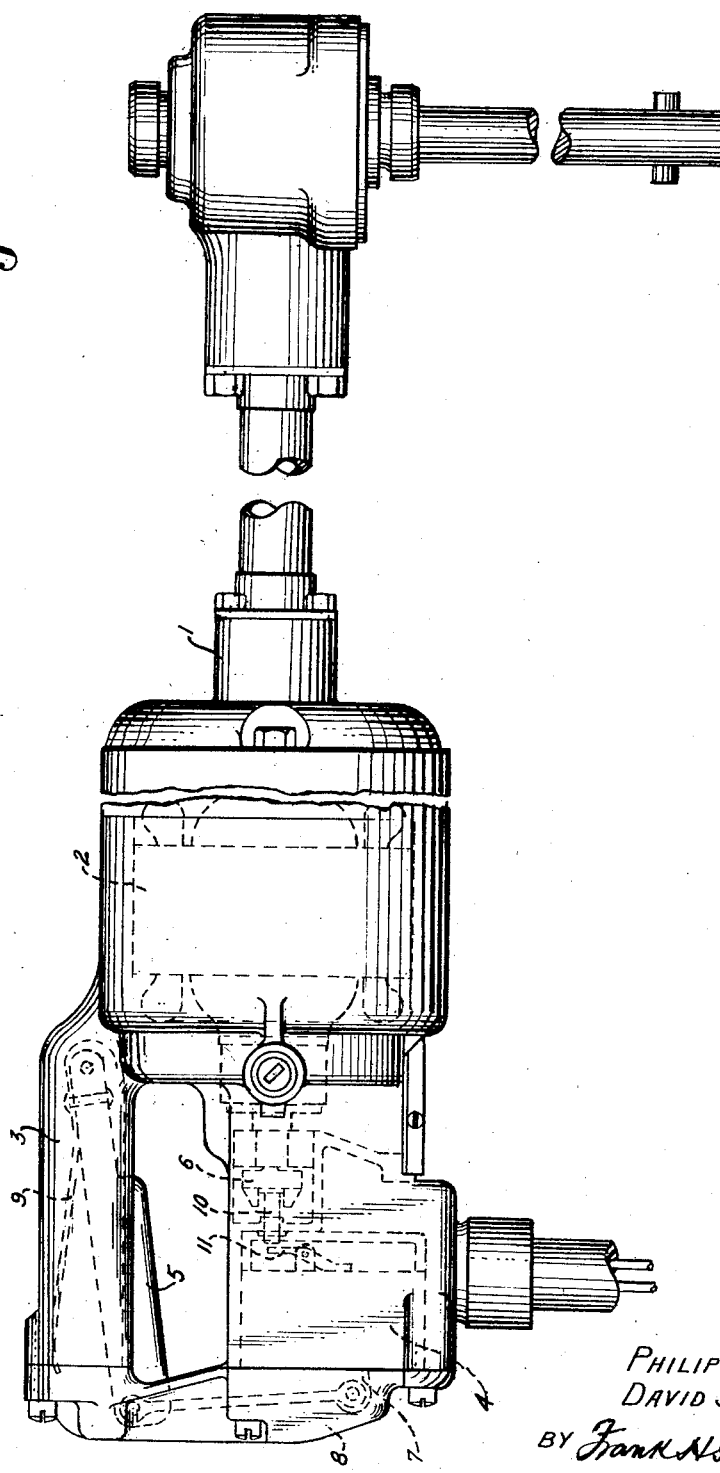
Figure 1 is an elevational view of an energizer having a control mechanism embodying the principles of the invention.

The energizer is indicated generally by the numeral 1 in Figure 1, the device being powered by a motor 2 and provided with a handle 3 for manipulating the device. Adjacent the handle is a switching device 4 arranged for manual operation by a grip member 5 in the handle and also by a governor 6 on the end of the motor shaft. Manual setting and tripping of the switching device is effected through a lever 7 connected to the grip member 5 through a link 8, a spring 9 serving to bias the grip member toward the position shown. Governor actuation of the switching device is effected by a plunger 10 arranged to bear against a tripping lever 11.

Figure 2:
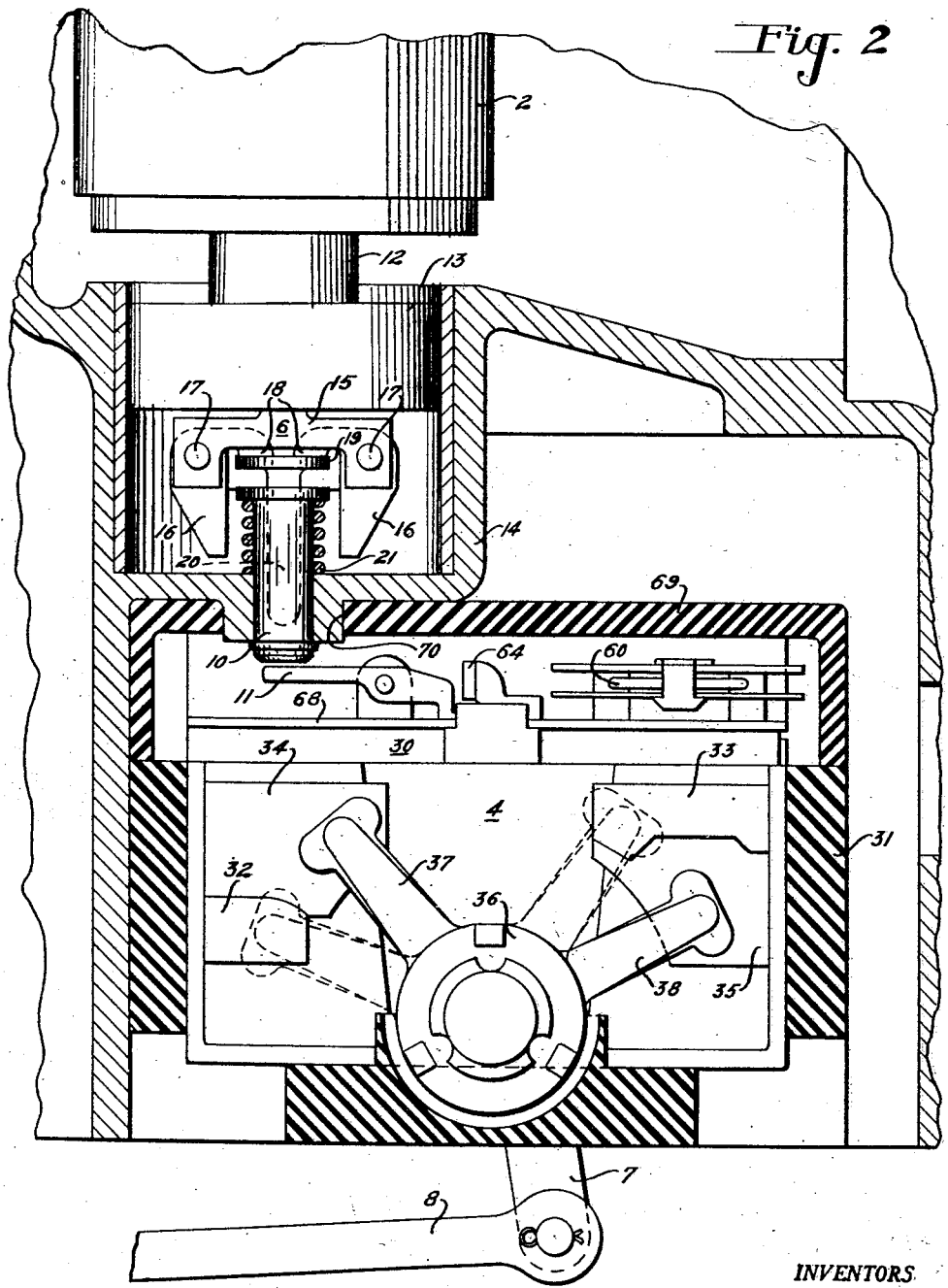
Figure 2 is an enlarged partial sectional view of the energizer illustrating the switching device and governor.

Reference will now be made to Figure 2 for a description of the governor 6. The numeral 12 designates the shaft of motor 2, the same being carried at the commutator end in a bearing 13 contained in a bearing housing 14. The shaft 12 terminates in a U-shaped member 15 carrying governor weights 16 pivoted on pins 17. Weights 16 are provided with bell crank arms 18 adapted to engage a head 19 on a pin 20 seated within the plunger 10. A spring 21 urges the plunger and pin inwardly of housing 14, and they are thereby constrained to remain in this position until the speed of shaft 12 is sufficient to cause the governor weights 16 to cam these parts outwardly and into engagement with tripping lever 11.

The operating parts of the switching device 4 are carried by a frame 30 contained in an insulating housing 31. Also contained within the housing 31 on opposite sides thereof are two pairs of stationary contacts 32 and 33 carried by insulating sheets 34 and 35. A rotary contact bridging member 36 is disposed between the stationary contacts, having arms 37 and 38 operated by snap action to occupy either the full line or broken line positions shown in Figure 2. It is understood that the organization shown in Figure 2 is duplicated on the other side of housing 31 to open both sides of the line.

Figure 3:
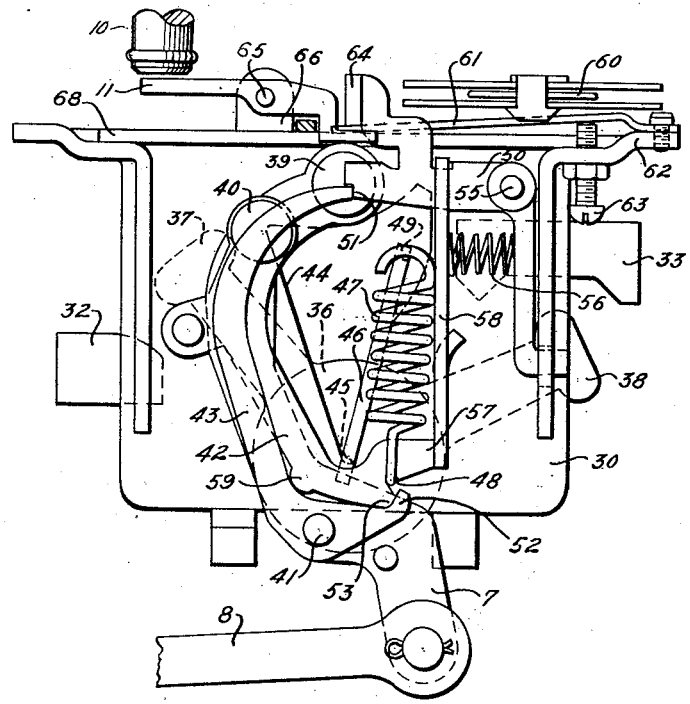
Figure 3 is a view showing the switch mechanism in off position, corresponding to Figure 1.
Figure 4:
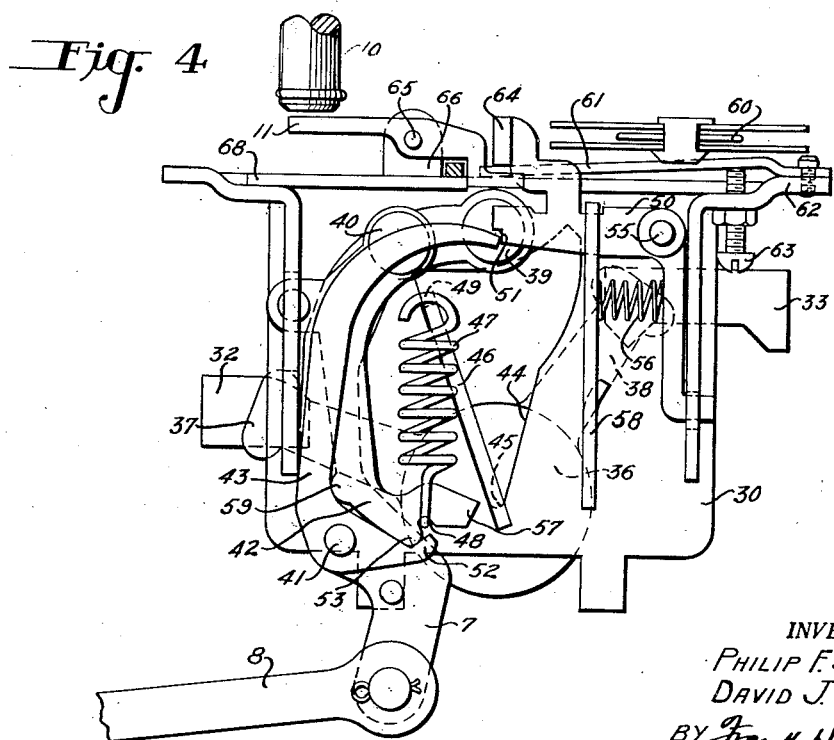
Figure 4 shows the switch mechanism in on position.
Figure 5:
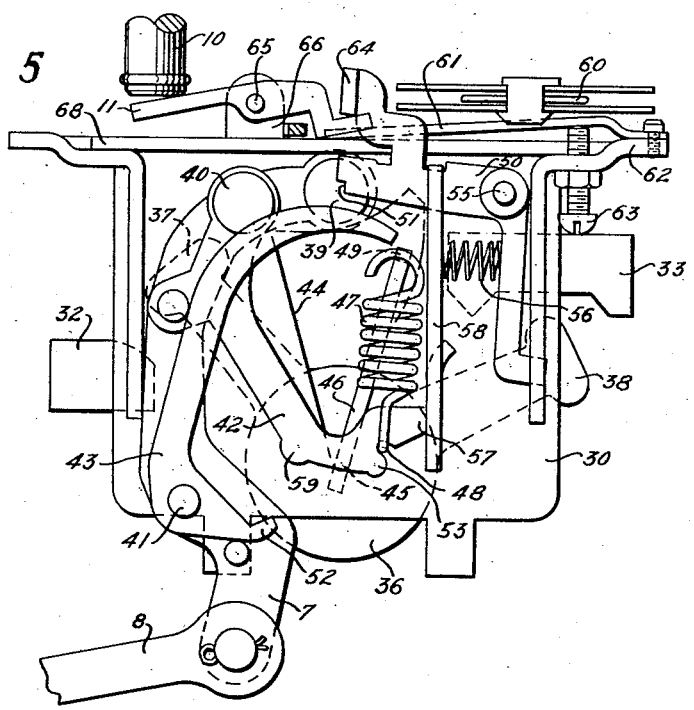
Figure 5 shows the switch mechanism after being tripped to off postiion by the governor, the manually operated parts being still held in on position.

The mechanism for operating the two bridging members 36 is shown in Figures 3, 4 and 5. The lever 7 is pivoted at 39 to the frame 30 and is provided with pivots 40 and 41 for carrying, respectively, a spring abutment lever 42, and an arm 43. The frame 30 is provided in its opposite sides with V-shaped openings 44 having bearing portions 45 to fulcrum a yoke 46 therein, the margins of the openings serving as stops to limit the swing of the yoke. The yoke 46 is of inverted U-shape, containing a tension spring 47 between the legs of the U, one end of said spring being hung in a notch 48 on spring abutment lever 42 and the other being hung in a notch 49 in the yoke. The lower extremity of each leg of yoke 46 carries one of the contact bridging members 36 keyed thereto concentric with the fulcrum 45 so that the arms 37 and 38 move with the yoke.

Figure 3 shows the parts in normal set position with grip 5 extended and member 36 in off position. When the grip 5 is squeezed into handle 3 the link 8 rotates lever 7 clockwise on its pivot 39. The upper end of arm 43 engages a detent 51 in a trip arm 50 causing the arm 43 to move with lever 7, the lower end of arm 43 having a hook 52 engaging a projection 53 on the spring abutment lever 42, causing the three members 7, 43 and 42 to move together from the position of Figure 3 to the position of Figure 4. When the notch 48 passes over center with respect to fulcrum 45 the spring 47 snaps the yoke 46 to the left to close the motor circuit.

The parts remain in the closed circuit positions of Figure 4 as long as grip 5 is depressed. Upon release of grip 5 the spring 9 returns the parts to the positions of Figure 3, opening the circuit.

As previously stated, the switching mechanism also provides for opening the motor circuit by the governor 6. When the motor exceeds a predetermined safe speed the governor weights 16 extend the plunger 10 so as to depress the outer end of tripping lever 11 as shown in Figure 5. Tripping lever 11 raises the trip arm 50 on its pivot 55 against the force of spring 56, this motion raising the detent 51 clear of the abutting end of arm 43. When arm 43 is thus freed it swings clockwise on its pivot 41 so that hook 52 moves down to release projection 53. This release frees spring abutment lever 42 to swing to the right, or counterclockwise, on its pivot 40 under the tension of spring 47 until a toe 57 is stopped by a wall 58 in the frame 30. This last described movement of spring abutment lever 42 from the position of Figure 4 to the position of Figure 5 carries the notch 48 back over center with respect to fulcrum 45, snapping the yoke 46 and contact arms 37 and 38 to open circuit position with all parts in the positions shown in Figure 5. Release of grip 5 allows the spring 9 to return the lever 7 to the right with the switch arms remaining in off position.

When lever 7 is moved to the right by spring 9 after the mechanism has been tripped by the governor an elbow 59 on spring abutment lever 42 engages the arm 43 above its pivot 41 swinging the top of arm 43 to the left and resetting it behind the detent 51, provided that the plunger 10 is sufficiently retracted by that time. The switch cannot be again turned on however until arm 43 is set behind the detent 51. In this manner, all parts of the mechanism are reset to the positions shown in Figure 3 in readiness for further operation of the motor.

The switching mechanism also includes overload current responsive tripping means. In series with one line to the motor is a short loop of resistance wire 60 adapted to develop heat on overload sufficient to warp a bimetallic bar 61. The bar 61 is attached in cantilever fashion to an overhanging portion 62 on the frame 30, adjustment being obtained by means of screw 63. The central portion of bar 61 lies across the area heated by the resistance element 60, and the extremity of bar 61 extends under one side of a T-head 64 on trip arm 50. The arrangement is such that when the motor circuit draws an excessive current for a time sufficient to heat the thermostat before the heat is dissipated the latter will lift the trip arm 50 to break the circuit in the same manner described in connection with the operation of the governor.

Figure 6:
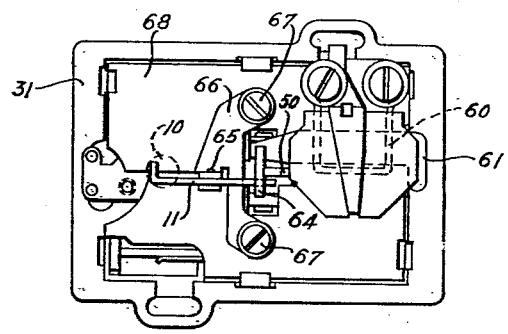
Figure 6 is a top view of the switching device.

Figure 6 shows the manner in which the T-head 64 on trip arm 50 is arranged for actuation by either the thermostat 61 or the governor operated tripping lever 11. The hermostatic strip extends from the right under one side of the head 64, and the lever 11 extends from the left under the other side of head 64. The lever 11 is pivoted at 65 on a bridge member 66 secured by screws 67 directly to the frame 30. The bridge member 66 rests on the surface of a stiff insulating sheet 68 covering the operating mechanism contained within the insulating housing 31.

The insulating housing 31 is preferably of box-like form, enclosing and containing the switching mechanism in the manner described. The top of the box is closed by a cover member 69 having an opening 70 over the tripping lever 11 for receiving the end of plunger 10, as shown in Figure 2, the arrangement being such that by disconnecting the link 8 the box 31 including the complete switching mechanism may be conveniently removed as a self-contained unit without disturbing the governor or other operating parts.

Various changes in the arrangement and construction will occur to persons skilled in the art and all such modifications are included in the invention. The invention is to be limited only by the scope of the prior art and the appended claims.

We claim:

1. In an energizer for an aircraft inertia starter, a motor, a switch mechanism for controlling said motor, a movable hand grip for manually operating said switch, a governor driven by said motor for operating said switch, and means operable upon release of said hand grip for setting said mechanism for another cycle of operation.

2. In an energizer for an aircraft inertia starter, a motor, a switch mechanism for controlling said motor, a movable hand grip for manually operating said switch, a governor driven by said motor for operating said switch, a current responsive overload release device for operating said switch, and means operable upon release of said hand grip for setting said mechanism for operation by any of said operating instrumentalities.

3. In an energizer for an aircraft inertia starter, a motor, a switch for controlling said motor, snap acting mechanism for closing and opening said switch, a movable hand grip for operating said mechanism, an independent release means, means arranged to be set by said hand grip and releasable by said release means to open said switch, and a governor driven by said motor for actuating said independent release means.

4. In an energizer for an aircraft inertia starter, a motor, a switch for controlling said motor, snap acting mechanism for closing and opening said switch, a movable hand grip for operating said mechanism, an independent release means, means arranged to be set by said hand grip and releasable by said release means to open said switch, a governor driven by said motor for actuating said independent release means, and a current responsive overload release device for actuating said independent release means.

5. In an energizer for an aircraft inertia starter, a motor, an enclosed bearing housing receiving one end of the shaft of said motor, a governor contained within said bearing housing and having a speed responsive plunger extending axially therefrom, a unitary switching mechanism contained within an insulating housing adjacent the end of said bearing housing, a movable hand grip member for operating said switching mechanism and for setting said switching mechanism for operation by said governor, and an opening in said insulating switch housing receiving the end of said plunger therein for operating said switching mechanism.

6. In an energizer for an aircraft inertia starter, a unitary switching mechanism, a lever for manually opening and closing said switch and for setting said mechanism for release by an independent instrumentality, a trip arm for effecting said release, a tripping lever for operating said trip arm, an insulating housing containing said switching mechanism as a unit including said trip arm and tripping lever, and an opening in said housing adapted to receive a plunger in operative relation with said tripping lever.

7. In an energizer for an aircraft inertia starter, a unitary switching mechanism, a lever for manually opening and closing said switch and for setting said mechanism for release by a plurality of independent instrumentalities, a trip arm for effecting said release, an upstanding T-head on said trip arm, an overhead current responsive thermostatic member having a movable portion underlying one side of said T-head, a bridge support on said mechanism, a tripping lever pivotally mounted on said support and having one end underlying the other side of said T-head, an insulating housing containing all of said above recited structure therewithin, and an opening in said housing adapted to receive a plunger in operative relation with said tripping lever, whereby said release may be effected by said thermostatic member or by said plunger.

PHILIP F. SCOFIELD.
DAVID J. CONANT.

CERTIFICATE OF CORRECTION.

Patent No. 2,348,656.                                            May 9, 1944.

PHILIP F. SCOFIELD, ET AL.

It is hereby certified that error appears in the printed specification of the above numbered patent requiring correction as follows: Page 3, first column, line 2, claim 7, for the word "overhead" read --overload--; and that the said Letters Patent should be read with this correction therein that the same may conform to the record of the case in the Patent Office.

Signed and sealed this 22nd day of August, A. D. 1944.

Leslie Frazer (Seal)                          Acting Commissioner of Patents.